US012414624B2

(12) United States Patent
Lee et al.

(10) Patent No.: US 12,414,624 B2
(45) Date of Patent: Sep. 16, 2025

(54) METHOD OF MANUFACTURING BAMBOO TOOTHBRUSH AND BAMBOO TOOTHBRUSH MANUFACTURED THEREBY

(71) Applicant: PROJECT NOAH, INC., Seoul (KR)

(72) Inventors: Kyung Tae Lee, Seoul (KR); Guen Woo Park, Seoul (KR); Eun Seob Kim, Seoul (KR)

(73) Assignee: PROJECT NOAH, INC., Seoul (KR)

(*) Notice: Subject to any disclaimer, the term of this patent is extended or adjusted under 35 U.S.C. 154(b) by 0 days.

(21) Appl. No.: 18/614,280

(22) Filed: Mar. 22, 2024

(65) Prior Publication Data

US 2024/0225259 A1 Jul. 11, 2024

Related U.S. Application Data

(63) Continuation of application No. 17/422,743, filed as application No. PCT/KR2019/012928 on Oct. 2, 2019, now Pat. No. 11,963,610.

(30) Foreign Application Priority Data

Jan. 16, 2019 (KR) ........................ 10-2019-0005623

(51) Int. Cl.

| | |
|---|---|
| ***A46D 3/00*** | (2006.01) |
| ***A46B 9/04*** | (2006.01) |
| ***B27J 1/00*** | (2006.01) |
| ***B27K 5/00*** | (2006.01) |

(52) U.S. Cl.

CPC .................. *A46D 3/00* (2013.01); *A46B 9/04* (2013.01); *B27J 1/00* (2013.01); *B27K 5/007* (2013.01); *B27K 5/0085* (2013.01); *A46B 2200/1066* (2013.01)

(58) Field of Classification Search

CPC ......... B27K 5/00; B27K 5/007; B27K 5/0085

See application file for complete search history.

(56) References Cited

FOREIGN PATENT DOCUMENTS

| | | | | |
|---|---|---|---|---|
| CN | 202367825 U | | 8/2012 |
| CN | 202820103 U | * | 3/2013 |
| CN | 109732711 A | * | 5/2019 |
| JP | 05-318980 A | | 12/1993 |

(Continued)

OTHER PUBLICATIONS

Sciencedirect. Darshil U. Shaha, Bhavna Sharmab, Michael H. Ramage, Processing bamboo for structural composites: Influence of preservative treatments on surface and interface properties, May 17, 2018, p. 1 (Year: 2018).*

(Continued)

*Primary Examiner* — Shay Karls

(74) *Attorney, Agent, or Firm* — Revolution IP, PLLC

(57) ABSTRACT

Disclosed is a method of manufacturing bamboo toothbrush and a toothbrush manufactured thereby. According to the method of manufacturing bamboo toothbrush of a detailed embodiment of the present invention and a toothbrush manufactured by the method, it is possible to improve strength, surface roughness, and moisture resistance of a bamboo and adjust the color of the bamboo using hot pressing. Further, since sanding and polishing and separate coating and drying are not performed, the process time is reduced, whereby the manufacturing cost can be reduced.

1 Claim, 4 Drawing Sheets

(56) References Cited

FOREIGN PATENT DOCUMENTS

| | | | |
|---|---|---|---|
| JP | 11-033936 | A | 2/1999 |
| JP | 11-290133 | A | 10/1999 |
| JP | 2005-059270 | A | 3/2005 |
| WO | WO2020/149191 | A1 | 7/2020 |

OTHER PUBLICATIONS

International Search Report for PCT/KR2019/012928, with English translation, dated Feb. 6, 2020, 2 pages.

* cited by examiner

METHOD OF MANUFACTURING BAMBOO TOOTHBRUSH AND BAMBOO TOOTHBRUSH MANUFACTURED THEREBY

CROSS-REFERENCE TO RELATED APPLICATIONS

This application is a continuation of U.S. patent application Ser. No. 17/422,743, filed on Jul. 13, 2021, entitled "METHOD OF MANUFACTURING BAMBOO TOOTHBRUSH AND BAMBOO TOOTHBRUSH MANUFACTURED THEREBY", which application claims priority to and is a 35 U.S.C. § 371 national phase application of PCT/KR2019/012928 (WO2020/149491A1), filed on Oct. 2, 2019 entitled "METHOD FOR MANUFACTURING BAMBOO TOOTHBRUSH AND BAMBOO TOOTHBRUSH MANUFACTURED BY SAME", which application claims priority to and the benefit of Korean Patent Application No. 10-2019-0005623, filed Jan. 16, 2019, the disclosures of which are incorporated herein by reference in their entirety. Any disclaimer that may have occurred during the prosecution of the above-referenced applications is hereby expressly rescinded, and reconsideration of all relevant art is respectfully requested.

TECHNICAL FIELD

The present invention relates to a method of manufacturing a bamboo toothbrush and a bamboo toothbrush manufactured thereby and, more particularly, to a method of manufacturing a bamboo toothbrush which can improve strength, surface roughness, and moisture resistance and can adjust colors of a bamboo by using hot pressing, can reduce the process time because it does not perform sanding, polishing, coating, and drying, and can manufacture bamboo toothbrushes in the same shape in a large quantity, and a bamboo toothbrush manufactured by the method.

BACKGROUND ART

In general, since the head and the grip of the stem of a toothbrush are integrally formed, toothbrushes are used as disposables or toothbrushes that run their courses are entirely discarded. However, since the stems of toothbrushes are usually made of synthetic resin, they cause environmental contamination when they are discarded. Such synthetic resin toothbrushes take over 100 to 200 years to be completely decomposed when they are buried. Further, they produce noxious and harmful substances including environment hormone when they are incinerated. Accordingly, there is a problem of environmental costs.

Recently, in order to solve this problem, echo-friendly toothbrushes have been developed not to do damage to the human body and not to influence the environment when they are discarded.

Meanwhile, bamboos are used to manufacture various daily supplies because they have characteristics that they have hard woody tissues, have elasticity, and are straight and not easily broken in the longitudinal direction. Recently, bamboos having these characteristics are used to manufacture toothbrushes with the echo-friendly trend, so bamboo toothbrushes are increasingly popularized.

However, in order to manufacture existing bamboo toothbrushes, in general, workers machine a bamboo rod into a toothbrush stem shape manually or semi-automatically and manually perform sanding and polishing to make the surface of the toothbrush stem flat and smooth. Coating for forming a coating layer on a surface and drying for drying the coating layer are performed on a toothbrush stem that has undergone this process to improve moisture resistance. Since the process of manufacturing bamboo toothbrushes in the related art is made manually or semi-automatically by workers, the quality of the products is not uniform, so mass production is difficult. Further, since there are many manufacturing steps, there is a problem of long process time.

SUMMARY OF INVENTION

Technical Problem

An object of the present invention is to provide a method of manufacturing a bamboo toothbrush which can improve strength, surface roughness, and moisture resistance and can adjust colors of bamboos by including hot pressing, and a bamboo toothbrush manufactured by the method.

Another object of the present invention is to provide a method of manufacturing a bamboo toothbrush which can reduce the manufacturing cost and can easily manufacture bamboo toothbrushes in a large quantity by reducing the process time including hot pressing because it does not perform sanding, polishing, coating, and drying.

Solution to Problem

According to an aspect of the present invention, a method of manufacturing a bamboo toothbrush includes steps of: a) CNC machining of machining a rod-shaped bamboo into a toothbrush stem shape; and b) hot pressing of inserting, heating, and pressing the machined bamboo in a press mold, in which the heating and pressing in the step b) have conditions of temperature of 100° C. to 220° C., time of 5 minutes to 60 minutes, and pressure of 0.2 MPa to 10 MPa, and a coating layer is formed on the surface of the bamboo by caramelization of a sugar content in the bamboo under the conditions.

According to another aspect of the present invention, a bamboo toothbrush includes a toothbrush stem made of a bamboo, in which a coating layer induced by a sugar content in the bamboo is formed on the surface of the toothbrush stem, and a surface roughness value Ra is $0\ \mu m < Ra \leq 2\ \mu m$.

Advantageous Effects of Invention

According to the method of manufacturing bamboo toothbrush of detailed embodiments of the present invention and a toothbrush manufactured by the method, it is possible to improve strength, surface roughness, and moisture resistance of a bamboo and adjust the color of the bamboo because hot pressing is included. Accordingly, it is possible to achieve a color with a beautiful design. Further, since sanding and polishing and separate coating and drying are not performed, the process time is reduced, whereby the manufacturing cost can be reduced. Further, it is possible to manufacture bamboo toothbrushes having the same shape in a large quantity by heating and pressing bamboos through hot pressing, using a press mold, which may be easy for mass production.

DESCRIPTION OF EMBODIMENTS

Figure 1:
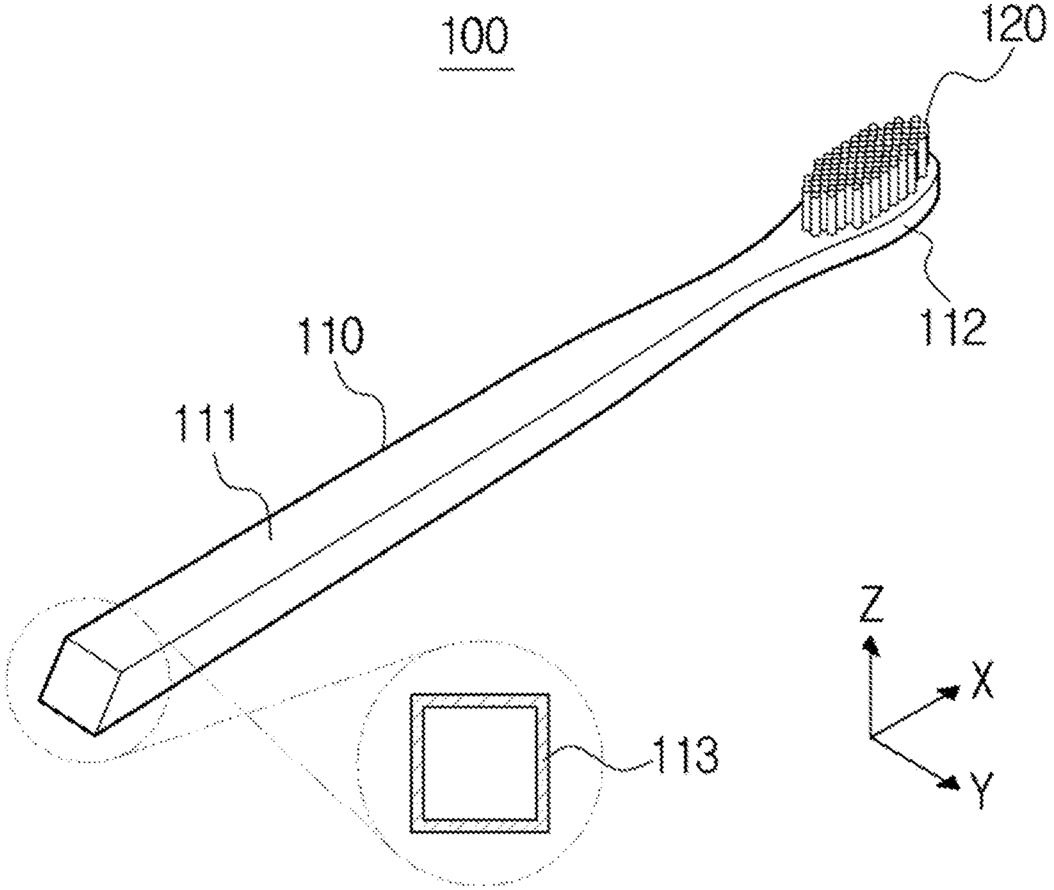
FIG. 1 is a perspective view of a bamboo toothbrush according to detailed examples of the present invention.

Hereinafter, embodiments of the present invention are described with reference to the accompanying drawings. However, it should be noted that the following embodiments are provided to help understand the present invention and the scope of the present invention is not limited by the following embodiments. The following embodiments are provided to more completely explain the present invention to those skilled in the art and the present invention is defined only within the range of claims. Like reference numerals indicate like components throughout the specification.

Bamboo Toothbrush

FIG. 1 is a perspective view of a bamboo toothbrush 100 according to detailed examples of the present invention. In the specification, the bamboo toothbrush 100 means a bamboo toothbrush 100 manufactured by the method of manufacturing a bamboo toothbrush according to a detailed example of the present invention. The method of manufacturing a bamboo toothbrush will be described in detail below.

In the specification, X-axial, Y-axial, and Z-axial directions are defined as the directions shown in FIG. 1, that is, the X-axis is the longitudinal direction, the Y-axis is the width direction, and the Z-axis is the height direction.

Referring to FIG. 1, the bamboo toothbrush 100 includes a toothbrush stem 110 and brush hairs 120.

The toothbrush stem 110 forms the entire external appearance of the bamboo toothbrush 100 and may function as a body keeping the brush hairs 120. The toothbrush stem 110 is made of a bamboo and a coating layer 113 induced from the sugar content of a bamboo can be formed on the surface of the toothbrush stem 110. In a detailed embodiment, the coating layer 113 may be formed on the outer surface of the toothbrush stem 110. The coating layer 113 shown in FIG. 1 is shown on the basis of a cross-sectional view in the Y-axial direction of the toothbrush stem 110. The moisture resistance of the toothbrush stem 110 is improved by forming the coating layer 113, whereby incidence of mold can be reduced. The surface roughness Ra of the toothbrush stem 110 may have a range of $0\ \mu m < Ra \leq 2\ \mu m$.

In the toothbrush stem 110, a grip 111 that a user holds with a hand and a head 112 connected to a side of the grip 111 and keeps the brush hairs 120 on one surface may be integrally formed. The toothbrush stem 110, as shown in FIG. 1, may extend in the X-axial direction and the joint between the grip 111 and the head 112 may decrease in width in the Y-axial direction, but the present invention is not limited thereto. The size of the toothbrush stem 110 may be 20 cm or less to be easily carried, but the present invention is not limited thereto.

The grip 111 may be elongated in a polygonal shape in the X-axial direction, but the present invention is not limited thereto.

The head 112 may be connected in an elliptical shape to a side of the grip 111. The head 112 has a plurality of holes for keeping the brush hairs 120 on one side, and several brush hairs 120 may be formed in the holes.

The brush hairs 120, which are parts that come in contact with teeth of a user and remove foreign substances from the surface of teeth, may be formed to have a height in the Z-axial direction, as shown in FIG. 1. The brush hairs 120 may have a uniform height or different heights in the Z-axial direction, but the present invention is not limited thereto, and the height may be changed depending on the design. The material of the brush hairs 120 is not limited and may be a material known in the art.

The bamboo toothbrush 100 according to a detailed example of the present invention has an eco-friendly advantage because it is made of a bamboo and is harmless to the human body and does not influence the environment when it is discarded. Further, since the coating layer 113 is formed, moisture resistance is improved, whereby the incidence of mold can be reduced.

Method of Manufacturing Bamboo Toothbrush

Figure 2:
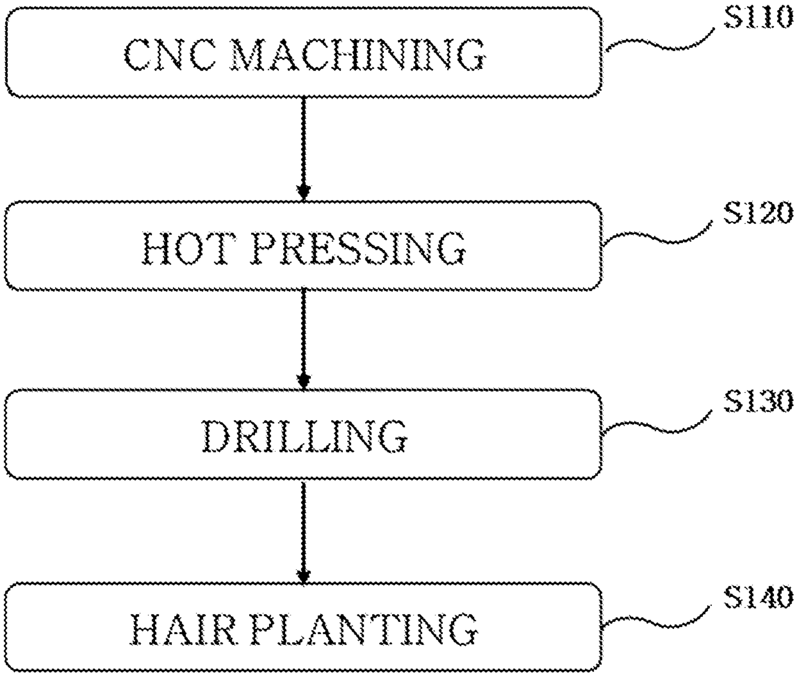
FIG. 2 is a flowchart showing a method of manufacturing a bamboo toothbrush for the bamboo toothbrush shown in FIG. 1.

FIG. 2 is a flowchart showing a method of manufacturing a bamboo toothbrush for the bamboo toothbrush 100 shown in FIG. 1.

Referring to FIG. 2, the method of manufacturing a bamboo toothbrush according to a detailed example of the present invention includes CNC machining S110 and hot pressing S120. The method of manufacturing a bamboo toothbrush may further include drilling S130 and hair planting S140.

The method of manufacturing a bamboo toothbrush according to a detailed example of the present invention can machine a rod-shaped bamboo into a toothbrush stem shape through CNC machining S110. In general, bamboos have characteristics that they have hard woody tissues, have elasticity, and are straight and not easily broken in the longitudinal direction. The bamboo having a toothbrush stem shape is heated and pressed through hot pressing S120, whereby the moisture in the bamboo can be removed. The coating layer 113 can be formed on the surface of the bamboo by caramelization of the sugar content of the bamboo. Caramelization, which is a phenomenon that is generated by oxidation reaction of a sugar content, is a non-enzymatic browning reaction in which an enzyme does not take part in expression of caramelization in the present invention.

The method of manufacturing a bamboo toothbrush according to a detailed example of the present invention can improve the strength, surface roughness, and moisture resistance of the bamboo toothbrush 100. Further, there is no need for sanding and polishing, and separate coating and drying for improving moisture resistance of the related art, and thus, the process time is reduced, whereby it is possible to decrease the manufacturing cost and easily manufacture bamboo toothbrushes in a large quantity. The rod-shaped bamboo is usually provided through carbonizing to remove moisture, bacteria, etc. from the bamboo. However, since the method of manufacturing a bamboo toothbrush includes hot pressing S120, it is possible to omit carbonizing or reduce the process time for carbonizing, thereby being able to reduce the manufacturing cost.

Each configuration is described in detail hereafter.

CNC Machining (S110)

CNC machining is to set up a workpiece on a table and to machine the workpiece in a desired shape with precision designed by a user. CNC, which is an abbreviation of Computer Numerical Control, means NC (numeral control device) having a computer. That is, CNC is a control method that makes an instruction tape (NC program) to which information about the shape or machining conditions of a workpiece is punched, generates an instruction pulse by reading out the instruction tape through an information processing circuit, and automatically performs machining in accordance with the instruction. Accordingly, there is an advantage, as compared with the manual process of the related art, that the quality of a machined product is stable, the process time can be remarkably reduced, whereby the manufacturing process can be decreased.

In step S110, a rod-shaped bamboo can be machined into a toothbrush stem shape through CNC machining. In a detailed example, it is possible to form the shape of a toothbrush stem in the X-axial and Y-axial direction and the height of the toothbrush stem in the Z-axial direction from the rod-shaped bamboo. The height of the toothbrush stem is the height before the rod-shaped bamboo is compressed through step S120.

Poisson's ratio is the ratio of transverse deformation and longitudinal deformation when normal stress is applied to a material. Poisson's ratio is a strength index of a material which is importantly considered to find out deformation in an elastic dead zone. Most materials are compressed in the normal direction in which normal stress acts and expanded in the horizontal direction perpendicular to the normal stress when the normal stress is applied. Accordingly, the rod-shaped bamboo may be machined in step S110 in consideration of the fact that it is expanded in the X-axial and Y-axial directions by Z-axial pressure due to Poisson's ratio in step S120.

The rod-shaped bamboo may be a bamboo having a rod shape through a general machining process. In detail, the machining process includes a process of cutting a bamboo in predetermined sizes and then removing the joints and the skin of the bamboo. Further, the machining process includes a process of longitudinally splitting the bamboo and then removing moisture, bacteria, etc. from the bamboo through carbonizing.

In general, bamboos have a porous structure and contain sugar, moisture, etc. Accordingly, if bamboos do not undergo carbonizing, mold can easily propagate in bamboos due to bacteria and moisture, so there may be a problem that stability and quality of products are deteriorated. Further, since a toothbrush is used in the bathroom which is always exposed to humidity, carbonizing was necessary for bamboos that are provided in a rod shape through the machining process in the related art. However, since the method of manufacturing a bamboo toothbrush according to a detailed example of the present invention includes hot pressing S120, it is possible to omit carbonizing or reduce the time for carbonizing.

Hot pressing S120 is described in detail hereafter.

Hot Pressing (S120)

Figure 3:
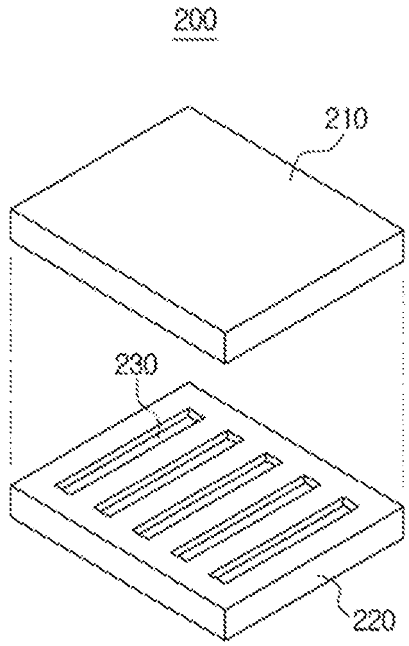
FIG. 3 is a perspective view of a press mold that is used in the hot pressing shown in FIG. 2.

FIG. 3 is a perspective view of a press mold 200 that is used for hot pressing S120 shown in FIG. 2.

Referring to FIG. 3, hot pressing that inserts, heats, and presses bamboos machined in a toothbrush stem shape through step S110 in the press mold 200 is performed in step S120. The machined bamboos include a first bamboo and a second bamboo that are different in property. When hot pressing is finished, the machined bamboos including the first bamboo and the second bamboo that are different in property are machined in the same shape of the toothbrush stem 110.

In general, bamboos show differences in property, depending on the sorts, the cultivation time, and the cultivation areas. Accordingly, since bamboo toothbrushes in the related art are manufactured manually or semi-automatically, they cannot be machined in the same shape when they are manufactured in a large quantity due to the property differences of bamboos, so there was a problem that many poor products are produced and mass production is difficult. For example, bamboos have joints that are relatively hard parts at different positions. Accordingly, many errors are generated when bamboos are machined, so there is a limitation in that products have different shapes. However, the method of manufacturing a bamboo toothbrush according to a detailed example of the present invention can machine the machined bamboos into the same shape by inserting, heating, and pressing the bamboos in the press mold 200 through hot pressing S120. Accordingly, bamboo toothbrushes 100 having the same shape can be manufactured in a large quantity. That is, it is possible to considerably reduce the defect rate of the toothbrush stems 110 through hot pressing. Since bamboo toothbrushes 100 having the same shape can be manufactured in a large quantity, the production efficiency can be remarkably improved in comparison to bamboo toothbrushes that are manufactured manually or semi-automatically.

The press mold 200 may include a cope 210 and a drag 220. The drag 220 has a plate shape and may have a cavity 230 therein in which the machined bamboos can be positioned. The cavity 230, which is a space in which the toothbrush stem 110 is formed, may be formed as one or more pieces. The larger the number of the cavities 230, the more the number of toothbrush stems 110 that can be manufactured through one process will be. The size and shape of the cavities 230 are not specifically limited and may be changed in accordance with the shape of the toothbrush stem 110. The cope 210 has a plate shape and may bring the machined bamboos in close contact with the top of the drag 220 by pressing the machined bamboos. Accordingly, the machined bamboos in the cavities 230 can be compressed in the Z-axial direction and can also be expanded in the X-axial and Y-axial direction. The shapes of the cope 210 and the drag 220 are not limited, and may be changed in accordance with the shape of a toothbrush stem, if necessary.

In a detailed example, the machined bamboos are placed into the drag 220. Next, the bamboos are compressed into a desired height by heating and pressing the bamboos through the cope 210. Accordingly, the machined bamboos can be pressed in the Z-axial direction and can have a uniform height, and can be expanded in the X-axial and Y-axial directions by the pressure applied in the Z-axial direction. The lengths expanding in the X-axial and Y-axial directions may depend on the pressure that is applied in the Z-axial direction. In a detailed example, toothbrush stems 110 having various heights can be manufactured by adjusting the height of the bamboos that are machined in the Z-axial direction in step S110 and the pressure that is applied to the bamboos in step S120.

In a detailed example, the heating and pressing have conditions of temperature of 100° ° C. to 220° C., time of 5 minutes to 60 minutes, and pressure of 0.2 MPa to 10 MPa. When the heating temperature is less than 100° C., the sugar content discharged from the bamboos is not sufficiently caramelized, and the coating layer 113 is not uniformly formed. However, when the heating temperature exceeds 220° C., the bamboos are excessively carbonized, so beautiful surface color cannot be obtained. Further, the toothbrush stem 110 may break when the brush hairs 120 are planted in hair planting S140 to be described below. When the pressure is less than 0.2 MPa, the moisture in the bamboos is not sufficiently removed, and it is preferable that the pressure does not exceed 10 MPa to protect the cope 210 and the drag 220. When the process time is less than 5 minutes, the moisture in the bamboos is not sufficiently removed and the coating layer 113 is not sufficiently formed. Further, when the process time exceeds 60 minutes, the process time is too long, so the production efficiency may be deteriorated.

In a detailed example, the temperature of the cope 210 may be set to be lower than the temperature of the drag 220. In detail, the cope 210 may have temperature that is 40° C. lower than that of the drag 220. The coating layer 113 formed on the upper portion of the toothbrush stem 110 that has undergone step S120 may have a color deeper than that of the coating layer 113 of the lower portion. This is caused by tissue structure differences between the upper and lower portions of the bamboo. In detail, this is because the upper tissue of the bamboo is denser than the lower tissue, so more sugar content is discharged from the upper tissue when it is pressed. However, the temperature of the cope 210 is set to be lower than the temperature of the drag 220 such that the upper and lower coating layers 113 of the toothbrush stem 110 have the same color, as described above, whereby it is possible to improve the quality of the product.

Moisture, sugar content, etc. are discharged from the toothbrush stem 110 formed through hot pressing under the conditions described above in step S120. Further, the coating layer 113 is formed on the surface of the toothbrush stem 110 by caramelization of the sugar content, so moisture resistance can be improved. Accordingly, the method of manufacturing a bamboo toothbrush according to a detailed example of the present invention can reduce the manufacturing cost because there is no need for separate coating and drying for improving moisture resistance. Further, in step S120, since it is possible to adjust the color of the toothbrush stem 110 by adjusting the heating temperature and the time condition, it is possible to obtain a beautiful surface color.

Pores of a bamboo having a porous structure are removed and the moisture, sugar content, etc. in the bamboo are discharged through step S120, whereby it is possible to increase the density of the bamboo. Accordingly, the strength of the bamboo is improved, so not only the lifespan of a product can be increased, but later designing or machining can also be more freely performed. Further, since the non-uniform surface of the bamboo is compressed, the surface roughness is improved, whereby it is possible to improve convenience for use and reduce the incidence of mold. When the surface roughness is poor, bacteria can relatively easily stick and propagate. This is the reason that when surface roughness is improved, incidence of mold decreases. As described above, in the process of manufacturing a bamboo toothbrush in the related art, sanding and polishing are performed to improve surface roughness. However, since the method of manufacturing a bamboo toothbrush according to the present invention performs hot pressing, it is possible to increase the production efficiency by omitting sanding and polishing, or if necessary, by performing sanding and polishing only on defective products. Further, since it is possible to omit separate coating and drying for improving moisture resistance, it is possible to reduce the manufacturing cost and manufacture toothbrush stems having the same shape in a large quantity. Accordingly, the method is advantageous in mass production.

In step S120, it is possible to remove most moisture in a bamboo by heating and pressing the bamboo. Accordingly, the method of manufacturing a bamboo toothbrush according to a detailed example of the present invention has an advantage in that it is possible to reduce the manufacturing cost because it is possible to not perform carbonizing for machining the rod-shaped bamboo or to reduce the carbonizing time.

Drilling (S130)

Next, drilling that forms a plurality of holes in the head 112 to plant the brush hairs 120 is performed on the toothbrush stem 110 that has undergone step S120.

Hair Planting (S140)

Next, a process of planting the brush hairs 120 in the holes formed through step S130 is performed. In step S140, brush hairs and a method of bonding brush hairs known in the art may be used to manufacture a toothbrush.

When step S140 is finished through the processes described above, the bamboo toothbrush 100 is completed.

The method of manufacturing a bamboo toothbrush according to a detailed example of the present invention can improve production efficiency by remarkably reducing a defect rate such as breaking of the toothbrush stem 110 in the process of planting the brush hairs 120 in step S140 by forming the toothbrush stem 110 having improved strength through the step S120.

Experimental Example

1. Manufacturing of Bamboo Sample

A bamboo sample that has undergone hot pressure was manufactured by performing step S120 on a rod-shaped bamboo in accordance with an embodiment of the present invention. The rod-shaped bamboo is a common bamboo being on the market and has undergone the common machining processes described above. The machining processes include carbonizing that was performed at 200° ° C. for 2 hours or 3 hours.

In order to manufacture a bamboo sample, a rod-shaped bamboo is placed first into the cavity 230 of the drag 220. Next, the upper surface of the rod-shaped bamboo is pressed by the cope 210 under a heating condition. The heating and pressing were performed at 2.3 MPa for 15 minutes under the condition that the cope 210 was at 200° C. and the drag 220 was at 200° ° C.

A bamboo sample for property estimation was achieved through this process. The bamboo sample was manufactured for property estimation and step S110 for forming the shape of a toothbrush stem was omitted. Further, steps S130 and S140 were omitted because they do not influence the properties of a bamboo.

2. Property Estimation

The properties of the bamboo sample (hereafter, referred to as Example) manufactured in accordance with the experimental example were estimated. In detail, a surface color change, a density change, a water content ratio change, and a surface roughness change of Example were estimated.

Surface Color Change Estimation

In order to estimate a surface color change of Example, a common rod-shaped bamboo that is on the market was prepared as a comparative group of Example. In this estimation, the rod-shaped bamboo has undergone a common machining process and has undergone carbonizing at 200° C. for 2 hours (Comparative Example 1).

Pictures of Comparative Example 1 and Example were taken by the same camera (LX10, Japan, Panasonic) under the condition that white light having 5000K color temperature was emitted. The photographing conditions were an aperture of F5.6, a shutter speed of 1/200 sec, ISO 125, white balance 6500K (color temperature).

As the result of surface color change estimation, it could be found that Comparative Example 1 had a bright beige color. However, it could be found that the upper surface and the lower surface uniformly changed into deep brown due to hot pressing in Example. That is, it could be found, in Example, that a coating layer 113 was formed by hot pressing. This is because when the bamboo was heated and pressed through hot pressing, sugar content was discharged from the bamboo and the discharged sugar content was caramelized. Further, it was found that the upper surface had a deeper color than the lower surface under the same temperature condition. It may be considered that this was because the upper tissue of the bamboo was denser than the lower tissue, so more sugar content was discharged from the upper tissue when it was pressed.

As the result of surface color estimation of the bamboo sample manufactured in accordance with an embodiment of the present invention, it could be found that a coating layer 113 induced from the sugar content in the bamboo was formed on the surface of the bamboo sample.

Density Change Estimation

In order to estimate a density change of Example, a common rod-shaped bamboo that is on the market was prepared as a comparative group of Example. In this estimation, the rod-shaped bamboo has undergone a common machining process and has undergone carbonizing at 200° C. for 2 hours (Comparative Example 1) and at 200° ° C. for 3 hours (Comparative Example 2).

Table 1 shows the result of measuring the density of Example. The density is a value obtained by measuring the weight of each of Example and Comparative Examples and dividing the weight by each volume. The volume is a product of the X-axial length (l*), the Y-axial length (w*), and the Z-axial height (h*) of each of Example and the Comparative Examples.

Though not shown in Table 1, the density of Comparative Example 1 was 592.74 $kg/m^3$ and the density of Comparative Example 2 was 542.35 $kg/m^3$. It may be considered that the reason that the density of Comparative Example 2 is lower than that of Comparative Example 1 is because since carbonizing was performed 1 hour more, moisture was evaporated and the content of moisture decreased, so the entire weight decreased.

TABLE 1

Result of measuring densities of bamboo samples that have undergone hot pressing

| Sample | l* [mm] | w* [mm] | h* [mm] | Mass [g] | Density [$kg/m^3$] |
|---|---|---|---|---|---|
| 1 | 187.91 | 14.28 | 7.91 | 13.30 | 626.48 |
| 2 | 188.08 | 14.18 | 7.76 | 14.61 | 705.89 |
| 3 | 187.46 | 14.29 | 7.36 | 12.30 | 623.35 |
| 4 | 187.63 | 14.48 | 6.95 | 12.13 | 642.45 |
| 5 | 187.82 | 14.33 | 6.87 | 12.57 | 679.86 |
| Average | 187.78 | 14.31 | 7.37 | 12.98 | 655.67 |

As shown in Table 1, the density of Example was 655.67 $kg/m^3$. Accordingly, it was found that the bamboo sample was compressed by hot pressing, so the density was increased. It may be considered that this is because the pores of the porous bamboo were removed by hot pressing, and moisture, sugar content, etc. were discharged, so the spaces occupied by pores, moisture, sugar content, etc. were compressed and filled up. Accordingly, the method of manufacturing a bamboo toothbrush according to a detailed example of the present invention can improve strength by increasing the density of the bamboo toothbrush 100.

Water Content Ratio Change Estimation

In order to estimate a water content ratio change of Example, Comparative Examples 1 and 2 that are the same as those described above were prepared as a comparative group of Example. In this estimation, the water content ratio was measured using a wooden moisture measurer (DT-129 by CEM). The minimum water content ratio that can be measured by the wooden moisture measurer is 6%, and the water content ratio of Example is a value calculated by reflecting a weight change of the bamboo sample before and after step S120 is performed in the initial water content ratio when step S120 is not performed.

As the result of water content ratio estimation, the water content ratio of Comparative Example 1 was 13.83% and the water content ratio of Comparative Example 2 was 12.218. Also, the water content ratio of Example was calculated as 0.603%. It may be considered that this is because since hot pressing was performed on Example, moisture was primarily discharged and removed by pressing and was secondarily evaporated and removed by high temperature.

Meanwhile, it may be considered that the water content ratio of Comparative Example 2 was lower than that of Comparative Example 1 because carbonizing was performed for 1 hour more, and it was found that 1.62% of moisture was removed due to carbonizing performed for 1 hour more at 200° C.

That is, it was found that the reduction of moisture due to carbonizing was relatively small. Accordingly, it could be found that the moisture of a bamboo was remarkably removed by pressing in hot pressing of the method of manufacturing a bamboo toothbrush according to an embodiment of the present invention.

Therefore, it was found that it is possible to not perform carbonizing for machining a rod-shaped bamboo or that it is possible to reduce carbonizing time by performing hot pressing.

Surface Roughness Change Estimation

In order to estimate a surface roughness change of Example, Comparative Example 1 that is the same as that described above was prepared as a comparative group of Example.

As described above, the technology of manufacturing a bamboo toothbrush of the related art performs sanding and polishing that make the surface of a toothbrush stem flat and smooth in order to improve surface roughness. Accordingly, Comparative Example 3 obtained by performing sanding (using sandpaper CW80) on a rod-shaped bamboo was prepared for clear comparison in surface roughness change estimation. Making a surface flat is relatively considerably influenced by sanding, so polishing was omitted for the convenience of experiment.

Surface roughness was measured by surface roughness measurement equipment (SJ-410, Mitutoyo, Japan) in this estimation.

Figure 4A:
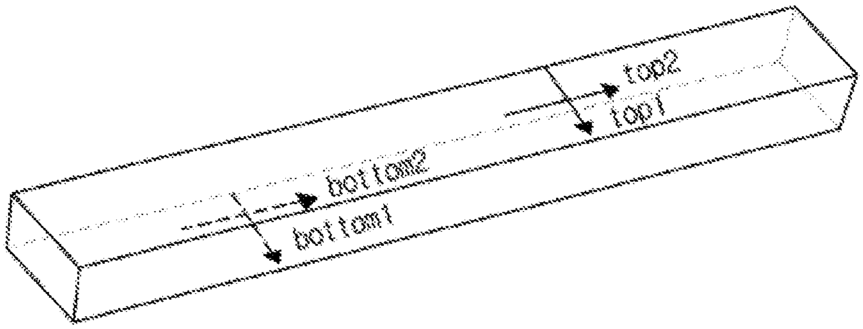
FIG. 4 is a view showing a surface roughness change estimation result of Example.
Figure 4B:
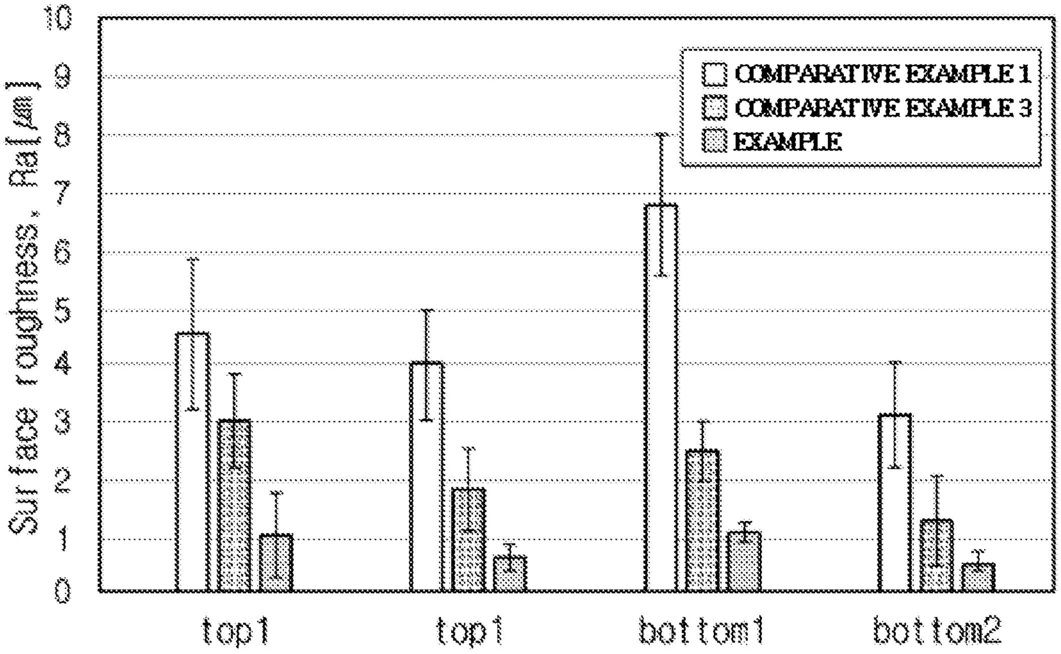

FIG. 4 is a view showing a surface roughness change estimation result of Example.

Referring to (a) of FIG. 4, surface roughness was measured on the top in the Y-axial direction (top 1), the top in the X-axial direction (top 2), the bottom in the Y-axial direction (bottom 1), and the bottom in the X-axial direction (bottom 2) of Example and Comparative Examples.

As the result of estimation, as shown in (b) of FIG. 4, the surface roughness value Ra of Example had a range of $0\ \mu m < Ra \leq 2\ \mu m$ at all of the positions, and the surface roughness values of Example were the most excellent at all the positions. In detail, it was found that the surface roughness of Example was improved by about 30 to 80% in comparison to Comparative Examples 1 and 3. Accordingly, it could be found that the surface of a bamboo is compressed and made flat and smooth by performing hot pressing in Example.

Further, it was found that the surface roughness was improved in Comparative Example 3 in comparison to Comparative Example 1 by performing sanding. However, the surface roughness of Example was remarkably improved in comparison to Comparative Example 3 even though sanding was not performed. Accordingly, it was found that, according to the method of manufacturing a bamboo toothbrush of a detailed example of the present invention, it is possible to omit sanding by performing hot pressing.

As described above, according to the method of manufacturing a bamboo toothbrush of a detailed example of the present invention and the bamboo toothbrush 100 manufactured by the method, since hot pressing is performed, it is possible to improve the strength, surface roughness, and moisture resistance of the bamboo toothbrush 100, and it is possible to achieve a color with a beautiful design because the color can be adjusted. Further, it is possible to not perform sanding and polishing, which were performed in the related art, or it is possible to perform sanding and polishing only on defective products, if necessary. Further, since separate coating and drying for improving moisture resistance are not performed, it is possible to increase production efficiency and reduce the manufacturing cost. Further, since the method of manufacturing a bamboo toothbrush includes hot pressing, it is possible to omit carbonizing for a rod-shaped bamboo that is usually provided through carbonizing, or it is possible to reduce carbonizing time, so the manufacturing cost can be reduced. Further, since the method of manufacturing a bamboo toothbrush includes hot pressing, it is easy to manufacture bamboo toothbrushes 100 having the same shape in a large quantity, and the production efficiency can be remarkably improved in comparison to bamboo toothbrushes that are manufactured manually or semi-automatically.

The spirit of the present invention was described in detail above. However, those skilled in the art may change the present invention in various ways such as simple design change, omission of some components, and simple change of the use by applying the technology within the spirit of the present invention. It is apparent that these changes are also included in the scope of the present invention.

REFERENCE SIGNS LIST

100: bamboo toothbrush
110: stem
111: grip
112: head
113: coating layer
120: brush hair
200: press mold
210: cope
220: drag
230: cavity

The invention claimed is:

1. A bamboo toothbrush comprising a toothbrush stem formed through hot pressing involving heating and compressing of a bamboo, wherein the toothbrush stem has an integral surface coating layer composed of caramelized sugar derived from the bamboo through caramelization during the hot pressing, and a surface roughness value Ra is $0\ \mu m < Ra \leq 2\ \mu m$, wherein the integral surface coating layer composed of caramelized sugar uniformly covers an outer surface of the toothbrush stem and has improved moisture resistance without any externally applied coating material while maintaining the surface roughness value Ra being $0\ \mu m < Ra \leq 2\ \mu m$ across an entirety of a coated surface of the toothbrush stem, wherein the hot pressing is defined only by temperature of 100° C. to 220° C., time of 5 minutes to 30 minutes, and pressure of 0.2 MPa to 10 MPa.

* * * * *